(12) United States Patent
Howard et al.

(10) Patent No.: US 7,607,008 B2
(45) Date of Patent: Oct. 20, 2009

(54) AUTHENTICATION BROKER SERVICE

(75) Inventors: John Hal Howard, Redmond, WA (US); Daniel Salvatore Schiappa, Bellevue, WA (US); Khaja E. Ahmed, Bellevue, WA (US); Kyle S. Young, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 10/817,154

(22) Filed: Apr. 1, 2004

(65) Prior Publication Data

US 2005/0223217 A1 Oct. 6, 2005

(51) Int. Cl.
*H04L 29/00* (2006.01)

(52) U.S. Cl. .............. 713/155; 713/168; 713/170; 726/2; 726/4; 726/8; 726/12; 726/21; 726/27

(58) Field of Classification Search ............ 726/2, 726/4, 8, 21, 27–29; 713/155, 168–170; 705/26, 44, 74–76, 78
See application file for complete search history.

(56) References Cited

U.S. PATENT DOCUMENTS

| | | | |
|---|---|---|---|
| 5,684,950 A | 11/1997 | Dare et al. | |
| 5,768,503 A | 6/1998 | Olkin et al. | |
| 5,815,665 A * | 9/1998 | Teper et al. | 709/229 |
| 5,991,802 A | 11/1999 | Allard et al. | |
| 6,067,623 A | 5/2000 | Blakley, III et al. | |
| 6,141,758 A | 10/2000 | Benantar et al. | |
| 6,178,511 B1 | 1/2001 | Cohen et al. | |
| 6,195,682 B1 | 2/2001 | Ho et al. | |
| 6,219,651 B1 | 4/2001 | Bublitz et al. | |
| 6,240,512 B1 | 5/2001 | Fang et al. | |
| 6,243,816 B1 | 6/2001 | Fang et al. | |
| 6,275,944 B1 | 8/2001 | Kao et al. | |
| 6,339,827 B1 | 1/2002 | Stokes et al. | |
| 6,351,819 B1 | 2/2002 | Berglund et al. | |
| 6,370,561 B1 | 4/2002 | Allard et al. | |
| 6,374,283 B1 | 4/2002 | Chessell et al. | |
| 6,453,362 B1 | 9/2002 | Bittinger et al. | |
| 6,687,831 B1 | 2/2004 | Albaugh et al. | |

(Continued)

OTHER PUBLICATIONS

Gifford, D. et al., "Payment Switches for Open Networks", Jul. 1995, Proceedings on fthe First USENIX Workshop on Electronic Commerce, pp. 1-9.*

(Continued)

*Primary Examiner*—Kambiz Zand
*Assistant Examiner*—Tongoc Tran
(74) *Attorney, Agent, or Firm*—Merchant & Gould P.C.

(57) ABSTRACT

A user is authenticated for a relying computing entity (e.g., an enterprise) through an authentication broker service, wherein a trust relationship exists between the relying computing entity and the authentication broker service. The authentication broker service has a trust relationship with the relying computing entity and the authentication service that issued the identity of the user. The relying computing entity asks the authentication broker service to authenticate the identity of the user. The authentication broker service captures the user's credential (or directs the authentication service to do so) and sends an authentication response (e.g., a token) to the relying computing entity in order to authenticate the identity of the user to the relying computing entity. The relying computing entity verifies the authentication response based on the trust relationship between the relying computing entity and the authentication broker service.

43 Claims, 5 Drawing Sheets

U.S. PATENT DOCUMENTS

| | | | |
|---|---|---|---|
| 6,954,778 | B2 | 10/2005 | Harjanto |
| 2002/0144108 | A1 | 10/2002 | Benantar |
| 2002/0144119 | A1 | 10/2002 | Benantar |
| 2002/0184507 | A1 | 12/2002 | Makower et al. |
| 2002/0194508 | A1 | 12/2002 | Sanchez et al. |
| 2003/0177388 | A1 | 9/2003 | Botz et al. |
| 2003/0221126 | A1 | 11/2003 | Berman et al. |
| 2003/0233543 | A1 | 12/2003 | Nagaratnam |
| 2003/0236975 | A1 | 12/2003 | Birk |
| 2004/0002878 | A1 | 1/2004 | Hinton |
| 2004/0030764 | A1 | 2/2004 | Birk et al. |
| 2004/0128506 | A1* | 7/2004 | Blakley et al. ............ 713/170 |
| 2004/0128541 | A1 | 7/2004 | Blakley et al. |
| 2004/0230831 | A1 | 11/2004 | Spelman et al. |
| 2005/0015593 | A1 | 1/2005 | Cheng et al. |
| 2005/0114701 | A1 | 5/2005 | Atkins et al. |
| 2005/0223217 | A1 | 10/2005 | Howard et al. |
| 2005/0277420 | A1 | 12/2005 | Shin et al. |
| 2006/0021019 | A1 | 1/2006 | Hinton et al. |
| 2006/0080352 | A1 | 4/2006 | Boubez et al. |
| 2006/0080730 | A1 | 4/2006 | Cahill |
| 2006/0112422 | A1 | 5/2006 | Tevosyan et al. |
| 2006/0123234 | A1 | 6/2006 | Schmidt et al. |
| 2007/0184819 | A1* | 8/2007 | Barriga-Caceres et al. .. 455/411 |

OTHER PUBLICATIONS

Bajaj et al., *WS-Federation: Passive Requestor Profile* [online], Version 1.0, Jul. 8, 2003, [Retrieved Mar. 4, 2007], Retrieved from: http://msdn2.microsoft.com/en-us/library/ms951223(d=printer).aspx. [34 pages].

Berners-Lee, T., Fielding, R., Masinter, L., *Uniform Resource Identifiers (URI): Generic Syntax*, RFC 2396, Aug. 1998. [40 pages].

Berners-Lee, T., Fielding, R., Masinter, L., *Uniform Resource Identifiers (URI): Generic Syntax*, RFC 3986, Jan. 2005. [55 pages].

Gaedke, M., Meinecke, J., Nussbaumer, M., *A Modeling Approach to Federated Identity and Access Management*, ACM 1-59593-051-5/05/0005, May 10-14, 2005. [2 pages].

Gomi, H., Hatakeyama, M., Hosono, S., Fujita, S., *A Delegation Framework for Federated Identity Management*, ACM 1-59593-232-1/05/0011, Nov. 11, 2005. [10 pages].

Del Vecchio, D., Basney, J., Nagaratnam, N., *CredEx: User-Centric Credential Management for Grid and Web Services*, 2005 IEEE International Conference on Web Services (ICWS 2005), Jul. 12-15, 2005. [8 pages].

Della et al., *Web Services Trust Language (WS-Trust)*, Version 1.0, Dec. 18, 2002. [30 pages].

Fielding et al., *Hypertext Transfer Protocol—HTTP*/1.1, RFC 2068, Jan. 1997. [162 pages].

Fielding et al., *Hypertext Transfer Protocol—HTTP*/1.1, RFC 2616, Jun. 1999. [219 pages].

IBM, *Web Services Trust Language* [online], [Retrieved Jan. 31, 2008], Retrieved from: http://www.ibm.com/developerworks/library/specification/ws-trust/. [2 pages].

Kohl, J., Neuman, C., *The Kerberos Network Authentication Service (V5)*, RFC 1510, Sep. 1993. [52 pages].

Lampson et al., *Authentication in Distributed Systems: Theory and Practice*, Digital Equipment Corporation, ACM Trans. Computer Systems 10, 4, pp. 265-310, Nov. 1992. [46 pages].

Lampson, B., Rivest, R., *SDSI—A Simple Distributed Security Infrastructure*, Sep. 15, 1996. [47 pages].

Leach et al., *A Conceptual Authorization Model for Web Services*, Computer Systems: Theory, Technology, and Applications, pp. 137-146, Feb. 2003. [8 pages].

NetBSD Programmer's Manual, *Name-Service Switch* [online], [Retrieved Apr. 11, 2007], Retrieved from: http://netbsd.gw.com/cgi-bin?nsswitch.conf++NetBSD-1.4.3. [3 pages].

Oasis, *SAML* [online], [Retrieved Jan. 31, 2008], Retrieved from: http://www.oasis-open.org/committees/tc_home.php?wg_abbrev=security. [8 pages].

Paschoud, J., McLeish S., *Managing Access to Decomate Resources*, Decomate2 Conference, Jun. 2000. [9 pages].

Secure Computing, *SafeWord PremierAccess* [online], [Retrieved Oct. 19, 2007], Retrieved from: http://www.ibm.com/developerworks/library/specification/ws-trust/. [14 pages].

Sun Microsystems, *Name-Service Switch* [online], [Retrieved Jan. 31, 2008], Retrieved from: http://compute.cnr.berkeley.edu/cgi-bin/man-cgi?nsswitch.conf. [9 pages].

www.oasis-open.org/committees/tc_home.php?wg_abbrev=security; May 7, 2003; 4 pages.

www.projectliberty.org/specs/main.html; May 7, 2003; 3 pages.

eTrust Single Sign-On, Mangeing User Access in an eBusiness Environment; Computer Associates; 2000; 11 pages; Islandia, NY.

Using-Tivoli SecureWay to Mange e-Business Security; www.cio.com/sponsors/060100_tivoli.html; May 6, 2003; 9 pages.

De Clercq, Jan; Single Sign-On Architectures; www.esat.kuleuven.ac.be/cosic/seminars/slides/sso.pdf; 2000; 30 pages.

Groβ, Thomas, "Security Analysis of the SAML Single Sign-on Browser/Artifact Profile," Computer Security Applications Conference, 2003; Dec. 8-12, 2003; pp. 298-307.

Liberty Alliance Project, "Liberty ID-FF Protocols and Schema Specification, Version: 1.2-errata-v3.0," 2004, http://www.projectliberty.org/specs/draft-liberty-idff-protocols-schema-1.2-errata-v3.0.pdf.

Microsoft Corporation, "Domain Controllers," 2000 http://www.microsoft.com/windows2000/en/advanced/help/sag_ADintro_26.htm?id=289.

IBM, Microsoft Corporation, "Passive Requestor Federation Interop Scenario Version 0.4," February 2004, ftp://www6.software.ibm.com/software/developer/library/ws-fpscenario2.doc.

Dierks, T.; Allen, C. "The TLS Protocol Version 1.0," RFC 2246, Jan. 1999, http://www.ietf.org/rfc/rfc2246.txt.

Kristol, D.; Montulli, L. "HTTP State Management Mechanism," RFC 2965, Oct. 2000, http://www.ietf.org/rfc/rfc2965.txt.

Jonsson, J; Kaliski, B. "Public-Key Cryptography Standards (PKCS) #1: RSA Cryptography Specifications Version 2.1," RFC 3447, Feb. 2003, http://www.ietf.org/rfc/rfc3447.txt.

Blake-Wilson, S.; Nystrom, M.; Hopwood, D.; Mikkelsen, J.; Wright, T. "Transport Layer Security (TLS) Extensions," Jun. 2003, http://www.ietf.org/rfc/rfc3546.txt.

National Institute of Standards and Technology, "Secure Hash Standard," FIPS 180-1, May 1994, http://www.itl.nist.gov/fipspubs/fip180-1.htm.

Freier, A.; Karlton, P.; Kocher, P. "The SSL 3.0 Protocol," Netscape Communications Corp., Nov. 1996, pp. 1-63.

* cited by examiner

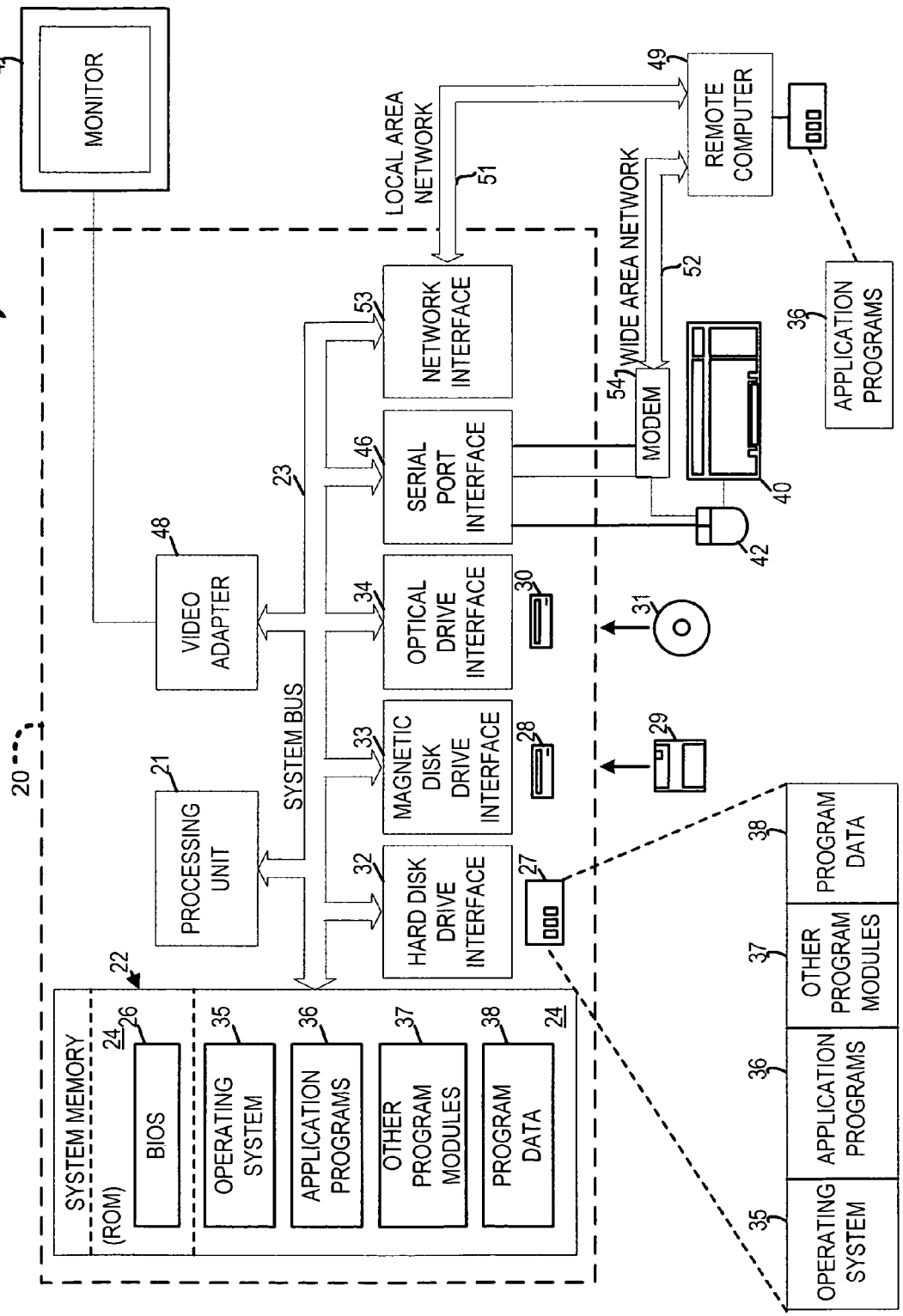

AUTHENTICATION BROKER SERVICE

TECHNICAL FIELD

The invention relates generally to computer system security, and more particularly to an authentication broker service.

BACKGROUND

Enterprises allow users to access to their computer systems for many reasons. In a typical scenario, a business will create a user account for an employee, which allows the employee to log into the business's computer system. Creating a user account generally involves issuing an identity for the user that is recognizable by the computer system. The login process authenticates the user (i.e., verifies the identity of the user) and allows the authenticated user to access resources and services in the system, in accordance with an appropriate authorization level.

In other scenarios, an enterprise may wish to allow users from external enterprises to access its computer system. For example, a business may allow customers to access some portion of its computer system to access specific resources and services (e.g., to place orders or to obtain support). In small enough volume, individual accounts with limited authorization may be reasonably created and maintained for such external users.

However, a large enterprise may desire to provide access to a large number of diverse and continuously changing external users. For example, a manufacturing company may allow some external access to its computer system by employees of its vendors and customers (e.g., for invoicing and order placement purposes). In this scenario, the external users can change continuously as employees for the external companies come and go. Managing this access by granting and maintaining individual accounts to a substantial number of external users can seriously tax the enterprise's information technology department.

SUMMARY

Implementations described and claimed herein address the foregoing problems by providing an authentication broker service. In one implementation, an authentication broker service works in combination with an authentication service, although these two services may be hosted by the same or different computing entities.

In a typical scenario, a user has an identity issued by one computing entity, such as by his or her employer's computer system. The user's identity is issued by an authentication service that maintains an authentication account associated wit the user. The authentication account stores authentication information sufficient to authenticate a purported identity of the user. The user, however, does not have an identity issued by a different computing entity that he or she wishes to access (e.g., a vendor's computer system). Accordingly, the other computing entity does not have an authentication account associated with the user and, therefore, cannot authenticate the user's identity directly.

Nevertheless, the user may be authenticated for the other computing entity (i.e., a "relying" computing entity) through an authentication broker service, wherein a trust relationship exists between the relying computing entity and the authentication broker service. The authentication service that issued the user's identity also has a trust relationship with the authentication broker service, although the relying computing entity and the authentication service do not have a relevant trust relationship between them. In this configuration, the relying computing entity can therefore ask the authentication broker service to authenticate the identity of the user through the authentication service.

Accordingly, the authentication broker service or the authentication service can capture the user's credential and send an authentication response (e.g., a security token) through the authentication broker service to the relying computing entity to authenticate the identity of the user to the relying computing entity. The relying computing entity verifies the authentication response based on the trust relationship between the relying computing entity and the authentication broker service. Thus, in a common scenario, the authentication broker service enables users, such as from small businesses, to be recognized by a larger enterprise without having an identity issued from the enterprise because the authentication broker service has trust relationships with both the enterprise and the authentication service that issued the user's identity.

In some implementations, articles of manufacture are provided as computer program products. One implementation of a computer program product provides a computer program storage medium encoding a computer program that can be read and executed by a computer system. Another implementation of a computer program product may be provided in a computer data signal embodied in a carrier wave by a computing system and encoding the computer program.

One implementation of a computer program product encodes a computer program for executing a computer process on a computer system, wherein the computer process authenticates an identity of a user seeking access to a relying computing entity, the identity of the user being issued by an authentication service. An authentication request is received at a broker service from the relying computing entity to authenticate the identity of the user. A first trust relationship exists between the relying computing entity and the broker service, and a second trust relationship exists between the authentication service and the broker service. An authentication response is received from the authentication service. An authentication response is sent from the broker service to the relying computing entity representing a trusted authentication of the identity of the user to the relying computing entity based on the first trust relationship and the second trust relationship.

In another implementation, a method of authenticating an identity of a user seeking access to a relying computing entity is provided, the identity of the user being issued by an authentication service. An authentication request is received at a broker service from the relying computing entity to authenticate the identity of the user. A first trust relationship exists between the relying computing entity and the broker service, and a second trust relationship exists between the authentication service and the broker service. An authentication response is received from the authentication service. An authentication response is sent from the broker service to the relying computing entity representing a trusted authentication of the identity of the user to the relying computing entity based on the first trust relationship and the second trust relationship.

In yet another implementation, a system for authenticating an identity of a user seeking access to a relying computing entity is provided, wherein the identity of the user is issued by an authentication service. An authentication broker service has a first trust relationship with the relying computing entity and a second trust relationship with the authentication service. The authentication broker service receives an authentication request from the relying computing entity to authenticate the identity of the user and receives an authentication response from the authentication service. The authentication broker service further sends an authentication response to the relying computing entity to represent a trusted authentication of the identity of the user to the relying computing entity based on the first trust relationship and the second trust relationship.

Another implementation of a computer program product encodes a computer program for executing a computer process on a computer system, wherein the computer process establishes a brokerable trust relationship between an authentication broker service and each of a plurality of computing entities. One or more brokered authentication rules governing brokered authentication through the authentication broker service are established. An agreement from each computing entity to comply with the one or more brokered authentication rules is obtained. The authentication broker service is configured to authenticate identities of one or more users for each computing entity in accordance with the one or more brokered authentication rules. The one or more users have identities issued by one or more authentication services having trust relationships with the authentication broker service.

In another implementation, a method of establishing a brokerable trust relationship between an authentication broker service and each of a plurality of computing entities is provided. One or more brokered authentication rules governing brokered authentication through the authentication broker service are established. An agreement from each computing entity to comply with the one or more brokered authentication rules is obtained. The authentication broker service is configured to authenticate identities of one or more users for each computing entity in accordance with the one or more brokered authentication rules. The one or more users have identities issued by one or more authentication services having trust relationships with the authentication broker service.

Other implementations are also described and recited herein.

BRIEF DESCRIPTIONS OF THE DRAWINGS

FIG. 5 illustrates a system useful for implementing an embodiment of the present invention.

DETAILED DESCRIPTION

In an exemplary implementation, a user is authenticated for access to an enterprise through an authentication broker service, because the enterprise does not possess the requisite authentication information for the user. An identity of the user has been issued by an authentication service, which maintains an authentication account containing the requisite authentication information associated with the user. Relevant trust relationships exist between the enterprise and the authentication broker service and between the authentication service and the authentication broker server, but not between the enterprise and the authentication service. Accordingly, the enterprise asks the authentication broker service to authenticate the identity of the user. The authentication broker service or the associated authentication service can capture the user's credentials and send an authentication response (e.g., a security token) through the authentication broker service to the enterprise to authenticate the identity of the user to the enterprise. The enterprise verifies the authentication response based on the trust relationship between the enterprise and the authentication broker service.

Figure 1:
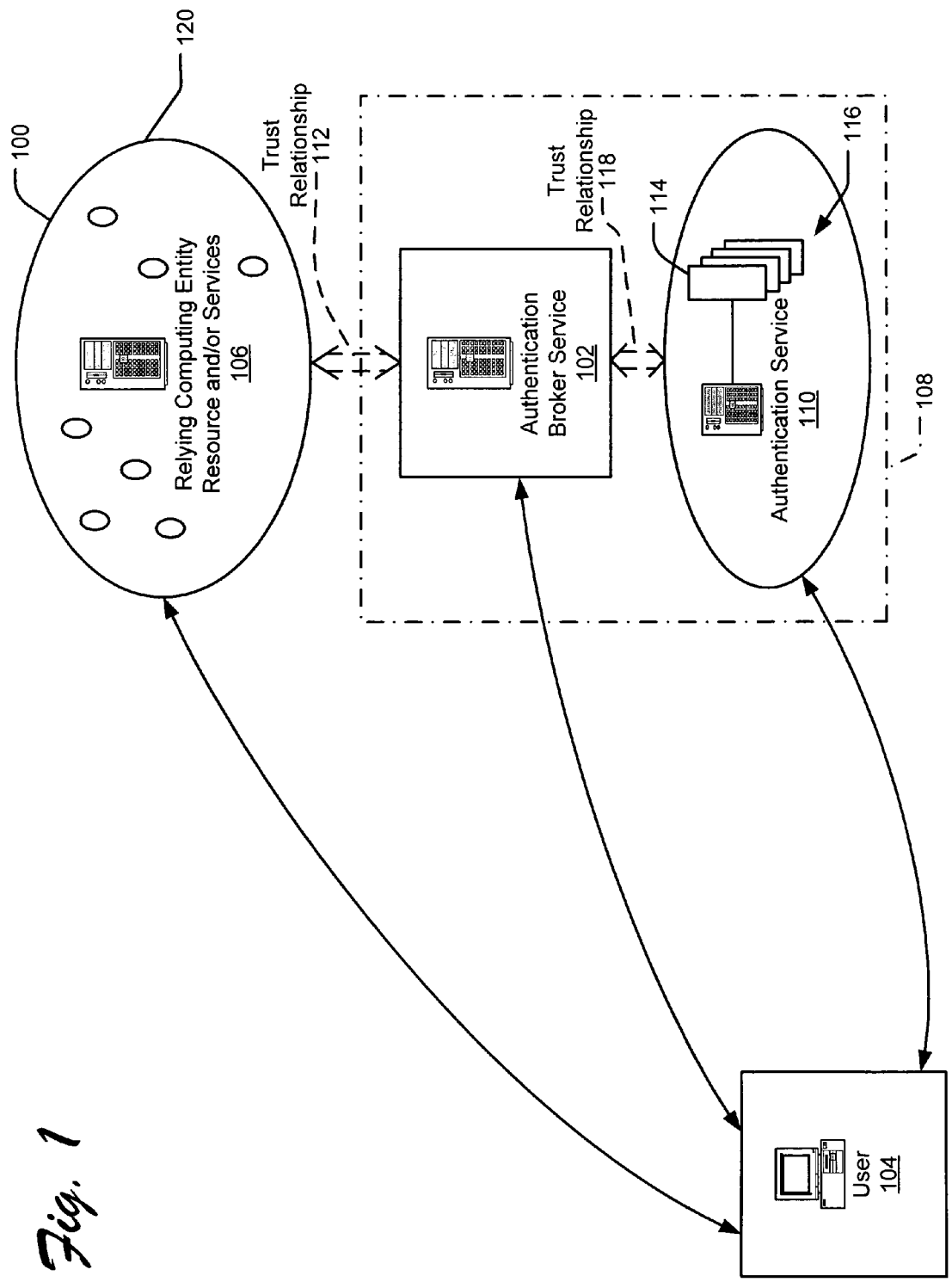
FIG. 1 represents a computing entity employing an exemplary authentication broker service to authenticate an external user.

FIG. 1 represents a relying computing entity 100 (e.g., an enterprise) employing an exemplary authentication broker service 102 to authenticate an external user 104. The relying computing entity 100 represents an organization, business, government entity, or other computing entity that includes one or more resources and/or services 106. The authentication broker service 102 can broker authentication operations for computing entities with which the authentication broker service 102 has established trust relationships (e.g., trust relationship 112).

An authentication service 110 can authenticate user identities that the authentication service 110 has issued. The authentication broker service 102 and the authentication service 110 also have an established trust relationship 118 between them, but a relevant trust relationship does not exist between the relying computing entity 100 and the authentication service 110.

It should be understood that the authentication broker service 102 and the authentication service 110 may be hosted on different computing systems and within different computing entities, although the two services may alternatively reside on the same computing system or within the same computing entity (as represented by dashed box 108).

The relying computing entity 100 may have issued identities for a variety of users (such as user 120) within the computing entity for authentication and authorization purposes. However, the relying computing entity 100 has not issued and does not recognize the identity of the external user 104. Instead, the authentication service 110 has issued the user's identity and maintains the relevant authentication account information. Thus, the authentication service 110 can authenticate the user 104 (e.g., by validating a credential provided by the user 104 against an authentication account 114 for the user 104). It should be understood that the authentication service 110 can maintain authentication accounts 116 for a variety of users.

An exemplary brokered authentication scenario includes an attempt by the user 104 to access the resources and/or services of the relying computing entity 100. However, in this scenario, the identity of the user 104 has not been issued by the relying computing entity 100 (hence, the user 104 is considered an "external" user). As such, the relying computing entity 100 cannot authenticate the identity of the user 104, although such authentication is required before access to resources and/or services 106 may be permitted. It should be understood that the external user is considered to exist logically "outside" the relying computing entity 100 but may be physically located anywhere. For example, the user 104 can reside physically within the premises of the relying computing entity 100 and still be considered an "external user".

Instead, in one implementation, the relying computing entity 100 establishes a trust relationship 112 with the authentication broker service 102 to broker authentication of the identities of certain external users. Generally, a trust relationship is set up in an initial stage to establish a trust domain or realm. A trust domain or realm represents an administered security space in which the source and target of a request can determine whether particular sets of credentials from the source satisfy the relevant security policies of the target. For example, entities may establish a trust domain by sharing a symmetric key or by agreeing to trust signatures created with a private key of other entities in the trust domain. Two entities may also establish a trust relationship based on a set of shared secrets between the two entities. A trust policy is established between two realms in a federation to enable the sharing of keys or the trusting of each other's signatures.

In a brokered authentication scenario, the target (e.g., the relying computing entity 100) does not possess adequate authentication information to authenticate the identity of the source (e.g., the user 104) and no trust relationship (or an inadequate trust relationship) exists between the user 104 and the relying computing entity 100. Accordingly, the relying computing entity 100 cannot authenticate the identity of the user 104. Therefore, the relying computing entity 100 defers the trust decision to a third party (e.g., the authentication broker service 102) in accordance with the brokered authentication rules set out in a trust relationship agreement.

A trust relationship may be defined through a variety of agreements, standards, and/or cooperative technologies (collectively referred to as "governance" defining brokered authentication rules) to make user identity and entitlements portable between the organizations. For example, a trust relationship may involve an exchange of security keys and a legal agreement between the relying computing entity and the organization maintaining the broker service to comply with the defined brokered authentication rules. In some implementations, a trust relationship involves common authentication token format and sharing of a trust policy relating to identity and entitlements supported between the entities in the trust relationship. A trust relationship may also represent an agreement by the parties to comply with security and privacy requirements. Appropriate reviews and audit may also be specified as part of the trust relationship.

Various token formats may be defined. Possible properties of security tokens are listed below without limitation:
- Security tokens contain signature of the issuing authority over the whole token.
- Security tokens contain a subject identifier uniquely identifying the entity for which the security token was granted. The originating realm of a given security token is derivable from the subject identifier.
- Security tokens contain a recipient identifier.
- Security tokens contain the time of initial authentication, validity interval, and the type of authentication that was performed.
- Security tokens contain identity information, provided schema describing the additional identify information is understood by the recipient.
- Security tokens are sent over a secure connection and are encrypted with the recipient's public key, which may be known to the broker service and/or authentication services.

As a result of the establishment of the trust relationship, the computing entity agrees to recognize assertions provided by the broker service. To establish the brokerable trust relationship, the broker service receives confirmation that the computing entity has agreed to comply with the brokered authentication rules (e.g., through a registration or configuration operation). Thereafter, the broker service enables instructions for receiving and validating authentication requests from the complying computing entity. The broker service may also establish trust relationships with one or more other complying computing entities.

As illustrated in FIG. 1, upon receiving the external user's access request, the relying computing entity 100 determines that it cannot authenticate the external user 104 and therefore requests authentication of the external user 104 by redirecting an authentication request through the user's computer system to the appropriate authentication broker service 102. If the relying computing entity 100 has entered trust relationships with multiple authentication broker services, the "appropriate" authentication broker service may be identified through a process referred to as "realm discovery". For example, the relying computing entity may query for the user's domain, or ask the user to specify or select an authentication broker service the user wishes to use.

Responsive to receipt of the authentication request, the authentication broker service 102 validates the request and authenticates the identity of the external user 104 through the authentication service 110. Responsive to this authentication, the authentication broker service 102 securely sends an authentication response (e.g., a security token) back to the relying computing entity 100, which verifies the authentication response. For example, in one implementation, such verification involves verifying that a received security token is formatted correctly, verifying the authorization broker service's signature, verifying the security token validity interval, and verifying properties requested by policy, such as a required authentication type, maximum time since authentication instance (e.g., a password must have been submitted within an hour), identity properties, etc.

If the relying computing entity 100 verifies the token, the relying computing entity 100 can then accept the identity of the external user 104 as authenticated based on the authentication response and the trust relationship between the relying computing entity 100 and the authentication broker service 102. Therefore, based on the authenticated identity of the external user 104, the relying computing entity 100 can issue an appropriate session ticket to the external user 104 authorizing access to the resources and/or services 106.

Figure 2:
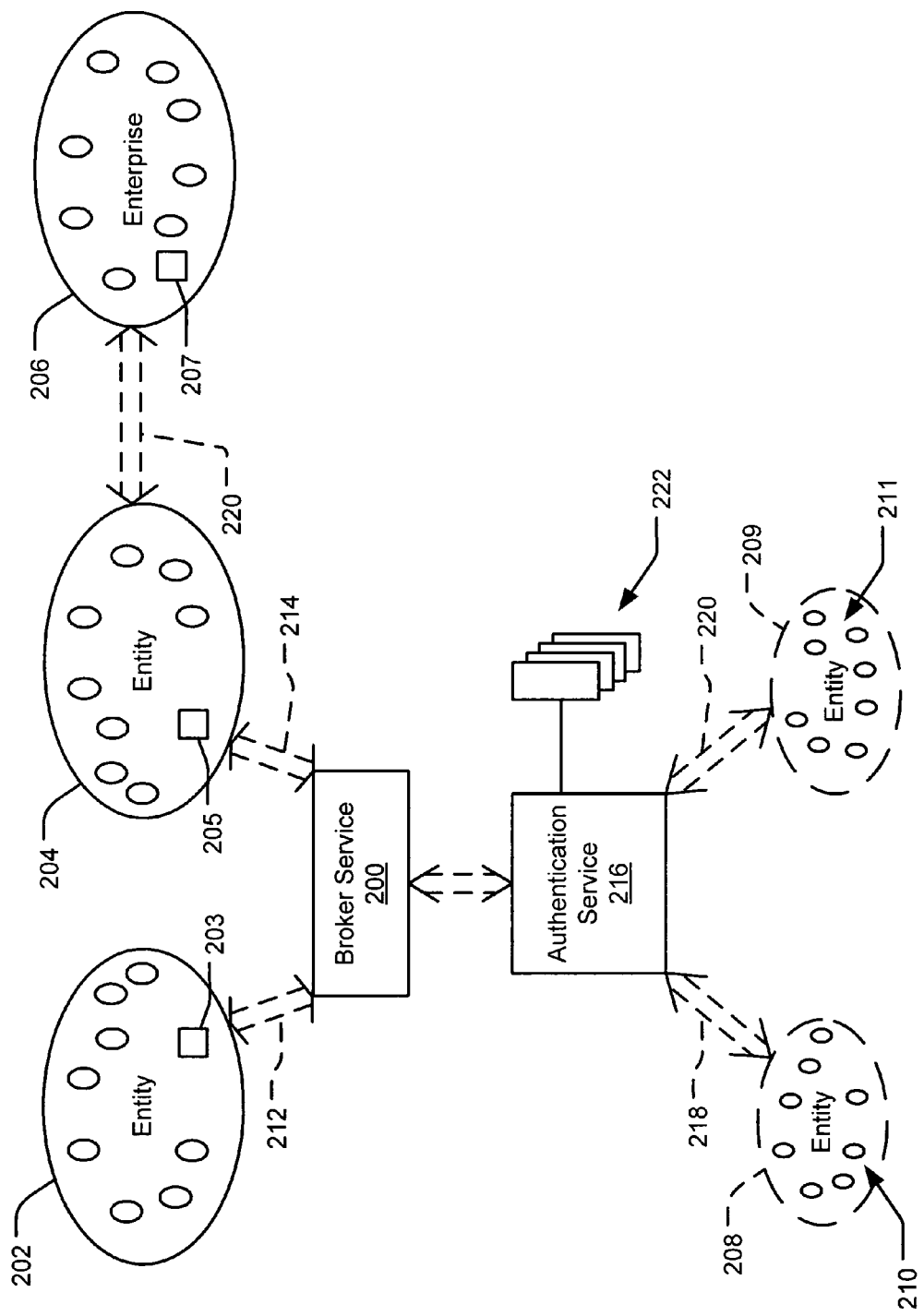
FIG. 2 illustrates an exemplary network of computing entities and trust relationships in association with an authentication broker service.

FIG. 2 illustrates an exemplary network of computing entities and trust relationships in association with an authentication broker service 200. The authentication broker service 200 has established trust relationships 212 and 214 with a computing entity 202 and a computing entity 204, respectively. In addition, the computing entity 204 also has an established trust relationship 220 with a computing entity 206, which does not have an established trust relationship with the authentication broker service 200. In the illustration of FIG. 2, the computing entities 202, 204, and 206 have their own authentication services 203, 205, and 207, respectively, for authenticating users for which they have issued identities. It should be understood that such internal authentication services interact with the authentication services enabling the computing entities 202 and 204 to participate in brokered authentication.

A computing entity 208 having users 210 and a computing entity 209 having external users 211, which may include without limitation individual users, processes, or other computing entities, have identities issued by an authentication service 216 and do not have adequate trust relationships with either of the computing entities 202 and 204 (e.g., do not have adequate authentication accounts at either of the computing entities 202 or 204). It should be understood that the users 210 of computing entity 208 and the users 211 of computing entity 209 may be numerous and continuously changing, as new users are added and existing user are removed.

The computing entities 208 and 209 have established trust relationships 218 and 220 with the authentication service 216, which issues identities for each of their users and maintains authentication accounts 222 for these users. An interface (not shown) exists for each computing entity 208 and 209 to administer the authentication accounts for their respective users in the authentication service 216.

In the configuration illustrated in FIG. 2, any of the external users 210 or 211 may be authenticated for access to the computing entities 202 and 204 through the authentication broker service 200. Accordingly, the computing entities 202 and 204 have agreed to recognize external users whose identities have been authenticated through the authentication broker service 200 and therefore do not need to maintain authentication information for such external users. Furthermore, registered users of computing entity 202 can be authenticated to computing entity 204 (and vice versa), even though computing entity 202 and computing entity 204 do not have a direct trust relationship, because computing entity 202 and computing entity 204 both have trust relationships with the authentication broker service 200.

Figure 3:
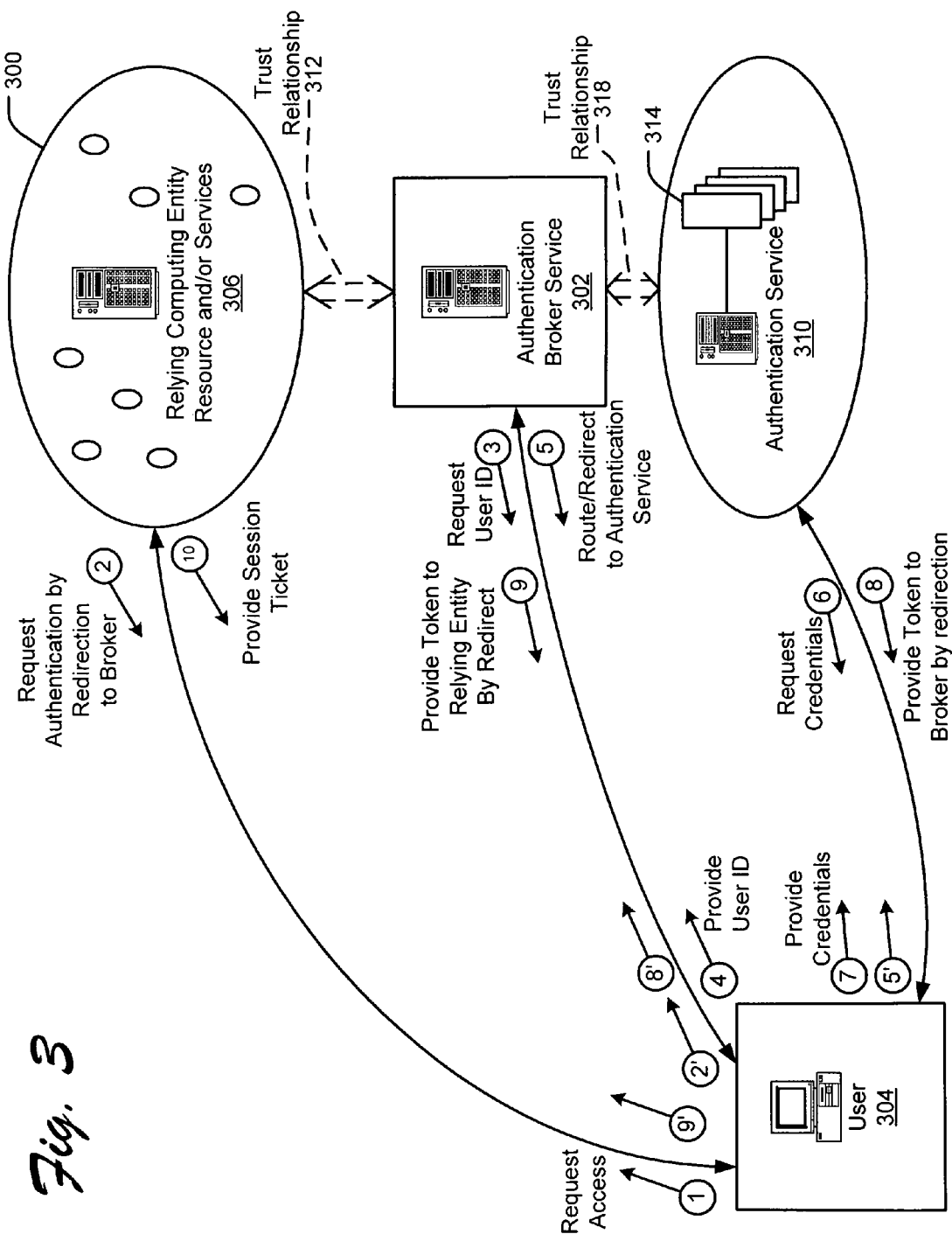
FIG. 3 illustrates communications among a computing entity, an exemplary authentication broker service, and an authentication service to authenticate an external user.

FIG. 3 illustrates communications among a relying computing entity 300, an exemplary authentication broker service 302, and an authentication service 310 to authenticate an external user 304. The relying computing entity 300 represents an organization that includes one or more resources and/or services 306.

However, the relying computing entity 300 does not have adequate authentication information about the external user 304 to authenticate the identity of the user The authentication broker service 302 can broker authentication operations for computing entities with which the authentication broker service 302 has established trust relationships (e.g., trust relationship 312). An authentication service 310 can authenticate user identities that the authentication service 310 has issued or for which the authentication service 310 maintains an authentication account. The authentication broker service 302 and the authentication service 310 also have an established trust relationship 318 between them, but a relevant trust relationship does not exist between the relying computing entity 300 and the authentication service 310.

The relying computing entity 300 has not issued and does not recognize the identity of the external user 304. Instead, the authentication service 310 has issued the user's identity. Thus, the authentication service 310 can authenticate the user 304 (e.g., by validating a credential provided by the user 104 against an authentication account 314 for the user 304). It should be understood that the authentication service 310 can maintain authentication accounts 316 for a variety of users.

Various messages are represented by numbered circle and arrow symbols in FIG. 3. It should be understood that each message may involve one or more component messages required to effect the communications required for each operation. The external user 304 sends a message (1) requesting access to the computing entity 300 (e.g., to gain access to the resources and/or services 306 of the computing entity 300). The computing entity 300 determines that it is unable to authenticate the identity of the requesting external user 304 and issues a message (2) requesting authentication of the external user 304 by redirection to the appropriate authentication broker service 302. In one implementation, the appropriate authentication broker service 302 is identified through realm discovery, and the message (2) is redirected to the identified authentication broker service 302 as a message (2'). Upon receipt of the authentication request of message (2'), the authentication broker service 302 validates message (2') to verify that the message actually originated from a relying computing entity with which it has an established trust relationship.

In one implementation, having successfully validated message (2'), the authentication broker service 302 issues a message (3) requesting a user ID from the user 304, which is returned to the authentication broker service 302 in message (4). The authentication broker service 302 validates the authentication request, performs realm discovery using the returned user ID, and routes or redirects the authentication request to the authentication service 310 in message (5). (A redirection is shown in combination with message (5'); however, it should be understood that the authentication broker service 302 and the authentication service 310 may also communicate directly.)

In response to the receipt of the authentication request of message (5'), the authentication service 310 validates the request and requests credentials from the user 304 by way of message (6) (e.g., a "challenge"). Typically, the message (6) provides a user interface of a prompt requesting entry of a login and password, although other credential requesting messages may alternatively be employed. For example, the user could also be authenticated using a digital certificate, smart card, or biometric device. The external user 304 inputs appropriate credentials and returns a message (7) providing these credentials to the authentication service 310.

Upon receipt of the credentials of the external user, the authentication service 310 validates of the credentials to authenticate the identity of the external user 304. In the illustrated implementation, the authentication service 302 accesses an authentication account 314 associated with the external user 304, which was created or updated through an administration interface (not shown) to the authentication service 310. As such, in the illustrated implementation, the authentication services 310 uses the authentication information in the authentication account 314 to authenticate the identity of the external user 304.

After the authentication service 310 validates the user's provided credentials using the authentication account 314 and provides a security token to the authentication broker service 302 via redirection through the user in messages (8) and (8'). Again, direct communication between the authentication service 310 and the authentication broker services 302 is also contemplated.

Responsive to the receipt of the security token, the authentication broker service 302 validates the security token and passes the token along to the relying computing entity 300 via redirection in messages (9) and (9'). The relying computing entity 300 validates the security token and provides a session ticket to the user 304 in message (10).

In another implementation, the authentication broker service 302 can omit the messages for collecting the user ID and redirecting to the authentication service 310. In this implementation, the authentication broker service 302 can collect the user's credentials, in response to receipt of the authentication request from the relying computing entity 300, and pass them directly to the authentication service 310 or redirect the user's credentials through the user to the authentication service 310. As such, in this implementation, the authentication broker service 302 can collect the user's credentials by providing the user interface prompt or operating some other interface for collecting the user's credentials.

As a security enhancement to an implementation in which the user's credentials may be collected by the authentication broker service 302, the credentials may be protected to prevent the authentication broker service 302 from interpreting them. For example, the credentials may be encrypted using a security key that is known to the authentication service 310 but is not known to the authentication broker service 302.

Other methods of protecting the credentials from interpretation by the authentication broker service 302 may also be employed.

Figure 4:
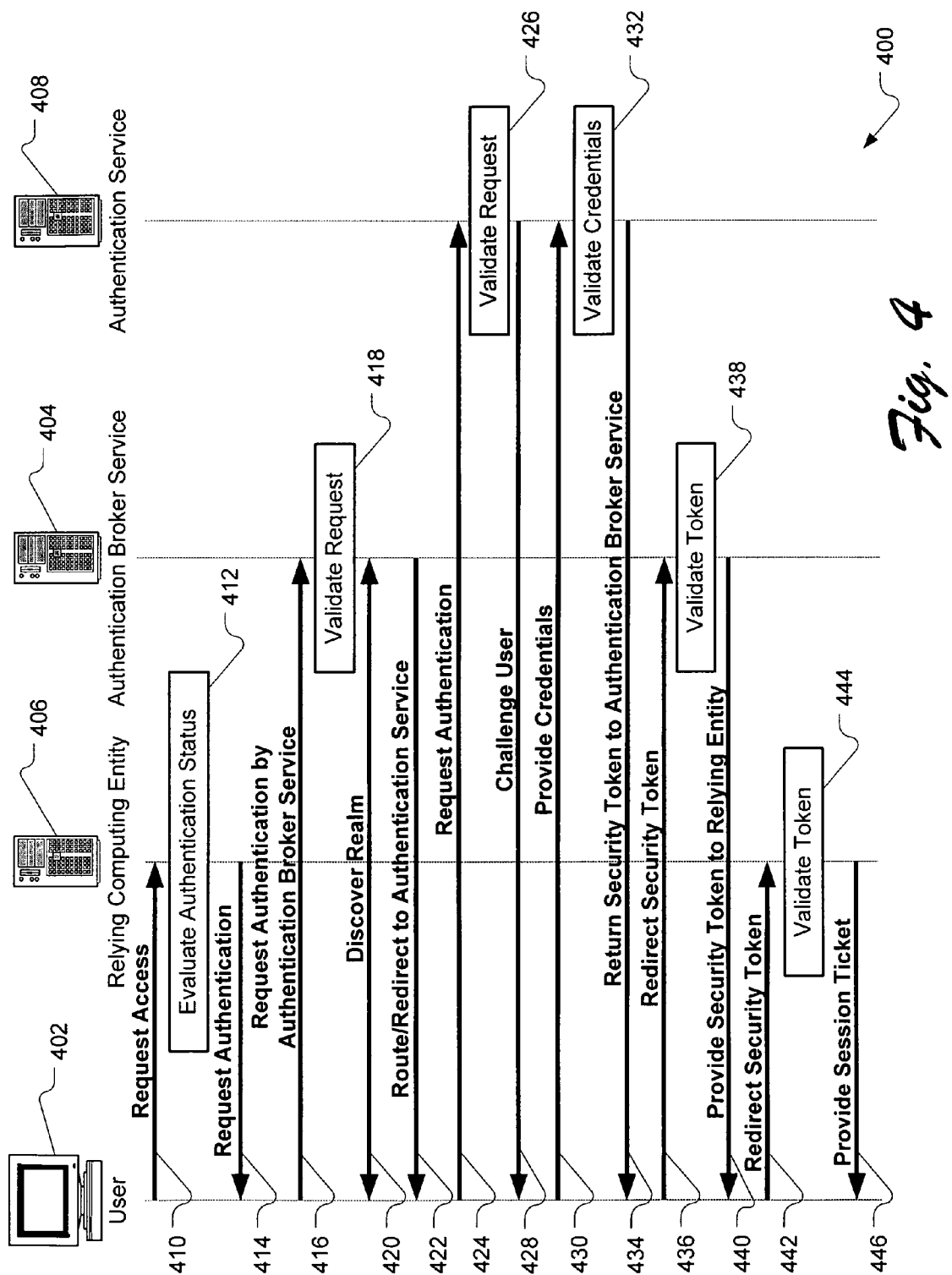
FIG. 4 illustrates operations and communications for authenticating the identity of an external user using an exemplary authentication broker service.

FIG. 4 illustrates operations and communications 400 for authenticating the identity of an external user 402 using an exemplary authentication broker service 404. The authentication broker service 404 has a trust relationship with a relying computing entity 406, which does not have a trust relationship with (or adequate authentication information for) the user 402. The authentication broker service 404 also has an established trust relationship with an authentication service 408, which issued the identity of the user 402 and maintains adequate authentication information about the user 402. In a message 410, the user 402 requests access to the relying computing entity 406, which evaluates the authentication status of the user 402 in an evaluation operation 412. If the relying computing entity 406 cannot authenticate the identity of the user 402, the relying computing entity 406 requests authentication within the relevant trust domain using the message 414.

The authentication request 414 is redirected through the user's computer system to the appropriate authentication broker service 404 as message 416. In a validation operation 418, the authentication broker service 404 validates the authentication request as coming from a relying computing entity with which it has an established trust relationship. The authentication broker service 404 performs a realm discovery operation 420 to identify the authentication service that should handle the authentication of the user 402.

Having identified the appropriate authentication service 408, the authentication broker service 404 routes or redirects the authentication request to the authentication service 408 in messages 422 and 424. The authentication service 408 validates the authentication request in validation operation 426 and challenges the user 402 in message 428. The user 402 provides credentials in message 430 to the authentication service 408, which validates the credentials in validation operation 432.

Based on the validation of the credentials, the authentication service 408 provides an authentication response (e.g., a security token) to the authentication broker service 404 in message 434 (directly, or through redirection 436). The authentication broker service 404 validates the authentication response in validation operation 438 and provides the authentication response to the relying computing entity 406 through redirection messages 440 and 442, thereby representing a trusted authentication of the user 402. The relying computing entity 406 validates the token in validation operation 444 and provides a session ticket in message 446 to the user 402. Given the session ticket, the user 402 is therefore authenticated to the relying computing entity 406.

An additional benefit of brokered authentication as described herein lies in the capability of an authentication broker service to switch or translate between different security protocols understood by a relying computing entity and an authentication service. For example, if the relying computing entity expects a digital certificate protocol to authenticate users and the authentication service provides a security token in Security Assertions Markup Language (SAML), the authentication broker service can anticipate this mismatch based on its knowledge of the supported protocols of the entities with which it has trust relationships (e.g., the relying computing entity and the authentication service) and translate the security token accordingly before sending it on to the relying computing entity.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited. It should be understood that implementations of the present invention may also exist in hardware environments including mobile phones, personal digital assistants, and other handheld devices.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, an authentication broker service module, resources, services, validation modules, authentication service modules, and other modules may be incorporated as part of the operating system 35, application programs 36, or other program modules 37. Security tokens, session tickets, trust policies, brokered authentication rules, credentials, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer-implemented method of authenticating an identity of a user seeking access to a relying computing entity, wherein the identity of the user is issued by an authentication service and is not issued by the relying computing entity, the method comprising:
   receiving at a broker service an authentication request from the relying computing entity to authenticate the identity of the user, wherein the authentication request does not include an identification of an authentication service;
   identifying, by the broker service, an appropriate authentication service among a plurality of authentication services, wherein
   (a) a first trust relationship exists between the relying computing entity and the broker service;
   (b) a second trust relationship exists between the identified authentication service and the broker service;
   (c) no relevant trust relationship exists between the identified authentication service and the relying computing entity; and
   (d) identifying of the appropriate authentication service is based at least in part on determining that the second trust relationship exists;
   receiving an authentication response from the identified authentication service at the broker service; and
   sending an authentication response from the broker service to the relying computing entity representing a trusted authentication of the identity of the user to the relying computing entity based on the first trust relationship and the second trust relationship.

2. The method of claim 1 further comprising: sending the authentication request to the identified authentication service, responsive to receiving the authentication request at the broker service.

3. The method of claim 1 further comprising: collecting a credential of the user, responsive to receiving the authentication request at the broker service; and sending the credential to the identified authentication service for validation by the identified authentication service.

4. The method of claim 1 wherein the credential cannot be interpreted by the broker service.

5. The method of claim 1 wherein the broker service and the identified authentication service are hosted by a single computing system.

6. The method of claim 1 wherein the broker service and the identified authentication services are hosted within a single computing entity.

7. The method of claim 1 wherein authentication account information associated with the user and maintained by the identified authentication service is accessible through an interface to the identified authentication service.

8. The method of claim 1 further comprising: validating based on the first trust relationship that the authentication request was received by the broker service from the relying computing entity.

9. The method of claim 1 wherein other computing entities have trust relationships established with the broker service.

10. The method of claim 1 wherein the first trust relationship represents an agreement between the broker service and the relying computing entity to comply with one or more brokered authentication rules.

11. The method of claim 1 wherein the first trust relationship represents an exchange of one or more security keys between the broker service and the relying computing entity.

12. The method of claim 1 wherein the first trust relationship represents an agreement by the relying computing entity to recognize assertions provided by the broker service.

13. The method of claim 1 wherein the operation of receiving at a broker service an authentication request is responsive to an access request by the user for access to the relying computing entity.

14. The method of claim 1 wherein the operation of receiving at a broker service an authentication request comprises: receiving the authentication request at the broker service as a redirected message through a computer system of the user.

15. The method of claim 1 further comprising: validating a credential received from the user by the identified authentication service.

16. The method of claim 1 further comprising: sending a challenge request to the user, responsive to the operation of receiving at a broker service an authentication request; and validating a credential received from the user in response to the challenge request.

17. The method of claim 1 further comprising: returning a session ticket to the user to allow user access to the relying computing entity.

18. The method of claim 1 further comprising: redirecting the user to the identified authentication service based on an identifier of the user.

19. The method of claim 1 further comprising: translating the authentication response received from the identified authentication service into a protocol recognized by the relying computing entity.

20. A computer-readable medium encoding computer executable instructions encoding a method for authenticating an identity of a user seeking access to a relying computing entity, wherein the identity of the user is issued by an authentication service, the computing process comprising:
receiving at a broker service an authentication request from the relying computing entity to authenticate the identity of the user, wherein the authentication request does not include an identification of an authentication service;
identifying, by the broker service, an appropriate authentication service from among a plurality of authentication services, wherein:
(a) a first trust relationship exists between the relying computing entity and the broker service;
(b) a second trust relationship exists between the identified authentication service and the broker service;
(c) no relevant trust relationship exists between the identified authentication service and the relying computing entity; and
(d) identifying of the appropriate authentication service is based at least in part on determining that the second trust relationship exits;
receiving an authentication response from the identified authentication service; and
sending an authentication response from the broker service to the relying computing entity representing a trusted authentication of the identity of the user to the relying computing entity based on the first trust relationship and the second trust relationship.

21. The computer-readable medium of claim 20 wherein the computer process further comprises: sending the authentication request to the identified authentication service, responsive to receiving the authentication request at the broker service.

22. The computer-readable medium of claim 20 wherein the computer process further comprises: collecting a credential of the user, responsive to receiving the authentication request at the broker service; and sending the credential to the identified authentication service for validation by the authentication service.

23. The computer-readable medium of claim 20 wherein the credential cannot be interpreted by the broker service.

24. The computer-readable medium of claim 20 wherein the broker service and the identified authentication service are hosted by a single computing system.

25. The computer-readable medium of claim 20 wherein the broker service and the identified authentication services are hosted within a single computing entity.

26. The computer-readable medium of claim 20 wherein authentication account information associated with the user and maintained by the identified authentication service is accessible through an interface to the authentication service.

27. The computer-readable medium of claim 20 wherein the computer process further comprises: validating based on the first trust relationship that the authentication request was received by the broker service from the relying computing entity.

28. The computer-readable medium of claim 20 wherein other computing entities have trust relationships established with the broker service.

29. The computer-readable medium of claim 20 wherein the first trust relationship represents an agreement between the broker service and the relying computing entity to comply with one or more brokered authentication rules.

30. The computer-readable medium of claim 20 wherein the first trust relationship represents an exchange of one or more security keys between the broker service and the relying computing entity.

31. The computer-readable medium of claim 20 wherein the first trust relationship represents an agreement by the relying computing entity to recognize assertions provided by the broker service.

32. The computer-readable medium of claim 20 wherein the operation of receiving at a broker service an authentication request is responsive to an access request by the user for access to the relying computing entity.

33. The computer-readable medium of claim 20 wherein the operation of receiving at a broker service an authentication request comprises: receiving the authentication request at the broker service as a redirected message through a computer system of the user.

34. The computer-readable medium of claim 20 wherein the computer process further comprises: validating a credential received from the user by the identified authentication service.

35. The computer-readable medium of claim 20 wherein the computer process further comprises: sending a challenge request to the user, responsive to the operation of receiving at a broker service an authentication request; and validating a credential received from the user in response to the challenge request.

36. The computer-readable medium of claim 20 wherein the computer process further comprises: returning a session ticket to the user to allow user access to the relying computing entity.

37. The computer-readable medium of claim 20 wherein the computer process further comprises: redirecting the user to the identified authentication service based on an identifier of the user.

38. The computer-readable medium of claim 20 wherein the computer process further comprises: translating the authentication response received from the identified authentication service into a protocol recognized by the relying computing entity.

39. A computer system for authenticating an identity of a user seeking access to a relying computing entity, wherein the identity of the user is issued by an authentication service, the computing system comprising:
an authentication broker service having a first trust relationship with the relying computing entity and a second trust relationship with an appropriate authentication service identified by the authentication broker service from among a plurality of authentication services, wherein the identifying of the appropriate authentication service is based at least in part on determining that the second trust relationship exists, the authentication broker service receiving an authentication request from the relying computing entity to authenticate the identity of the user, wherein the authentication request does not include an identification of an authentication service, and receiving an authentication response from the appropriate authentication service, the authentication broker service further sending an authentication response to the relying computing entity representing a trusted authentication of the identity of the user to the relying computing entity based on the first trust relationship and the second trust relationship.

40. A method of establishing a brokerable trust relationship between an authentication broker service and each of a plurality of computing entities, the method comprising:

establishing one or more brokered authentication rules governing brokered authentication through the authentication broker service;

obtaining an agreement from each computing entity to comply with the one or more brokered authentication rules; and configuring the authentication broker service to authenticate identities of one or more users for each computing entity in accordance with the one or more brokered authentication rules, wherein the one or more users have identities issued by one or more appropriate authentication services identified by the authentication broker service from a plurality of authentication services, the one or more appropriate authentication services having trust relationships with the authentication broker service, wherein identifying of the appropriate authentication service is based at least in part on determining that the trust relationship exists.

41. The method of claim 40 further comprising: exchanging one or more security keys between the authentication broker service and each of the computing entities.

42. A computer-readable medium encoding computer executable instructions encoding a method for establishing a brokerable trust relationship between an authentication broker service and each of a plurality of computing entities, the computer process comprising:

establishing one or more brokered authentication rules governing brokered authentication through the authentication broker service;

obtaining an agreement from each computing entity to comply with the one or more brokered authentication rules; and configuring the authentication broker service to authenticate identities of one or more users for each computing entity in accordance with the one or more brokered authentication rules, wherein the one or more users have identities issued by one or more appropriate authentication services identified by the authentication broker service from a plurality of authentication services, the one or more appropriate authentication services having trust relationships with the authentication broker service, wherein identifying of the appropriate authentication service is based at least in part on determining that the trust relationship exists.

43. The computer-readable medium of claim 42 wherein the computer process further comprises: exchanging one or more security keys between the authentication broker service and each of the computing entities.

* * * * *